C. C. CRAVEN.
TRACTOR.
APPLICATION FILED SEPT. 8, 1915.

1,224,716.

Patented May 1, 1917.
3 SHEETS—SHEET 1.

WITNESSES
Guy M. Spring
W. Evals Jr.

INVENTOR
Claud C. Craven.

BY
Richard Owen,
ATTORNEY

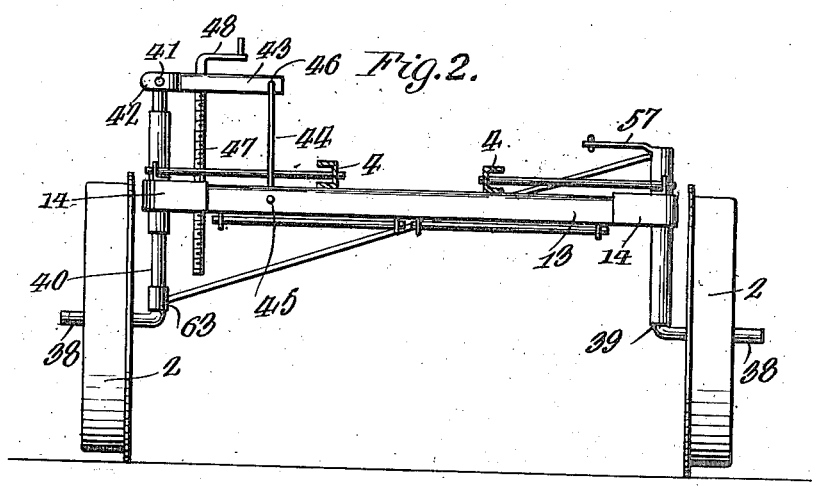

C. C. CRAVEN.
TRACTOR.
APPLICATION FILED SEPT. 8, 1915.
1,224,716.
Patented May 1, 1917.
3 SHEETS—SHEET 3.
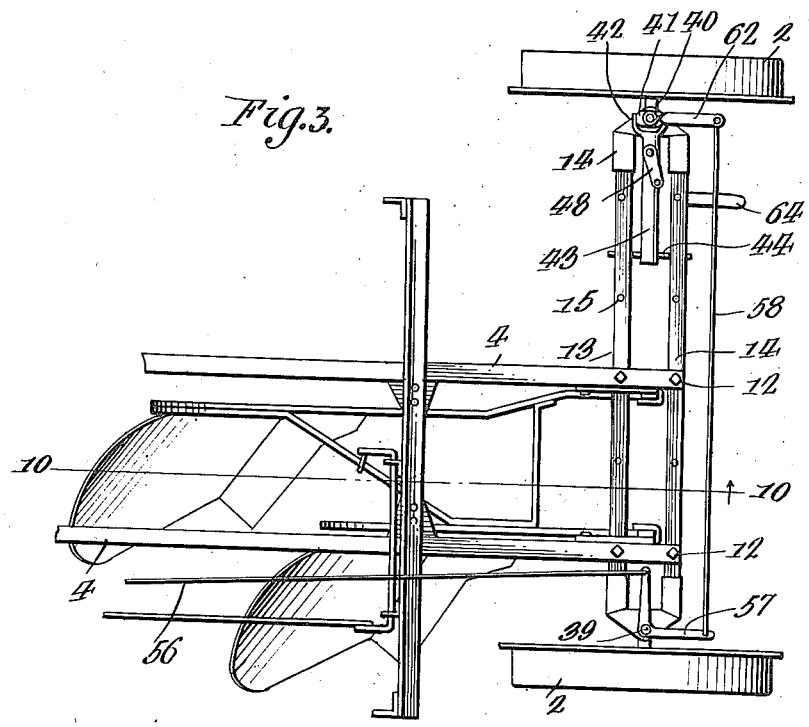
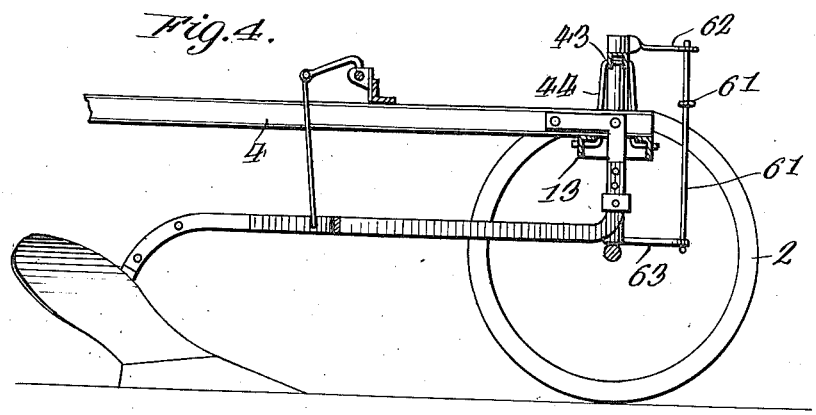

UNITED STATES PATENT OFFICE.

CLAUD C. CRAVEN, OF WAURIKA, OKLAHOMA.

TRACTOR.

1,224,716. Specification of Letters Patent. Patented May 1, 1917.

Application filed September 8, 1915. Serial No. 49,478.

*To all whom it may concern:*

Be it known that I, CLAUD C. CRAVEN, citizen of the United States, residing at Waurika, in the county of Jefferson and State of Oklahoma, have invented certain new and useful Improvements in Tractors, of which the following is a specification.

My invention relates to mechanically driven tractor devices and more especially to an improved tractor or motor vehicle of a construction particularly adapted for use in agricultural communities where the exigencies of use demand a varied employment of the tractor.

I further contemplate an improved and simplified means whereby the mentioned frame may be maintained perfectly level and in a substantially horizontal plane.

I still further contemplate a machine frame and steering wheels therefor of a construction permitting adjustment of the former laterally with respect to the latter that the soil turning devices may follow in predetermined channels or paths.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Fig. 2 is a front elevation illustrating the means utilized to maintain the machine frame at all times in a substantially horizontal plane;

Fig. 3 is a top plan view of the forward part of the machine illustrating the manner in which the machine frame may be adjusted laterally with respect to the steering wheels; and Fig. 4 is a section on the line 10—10 of Fig. 3.

Figure 1:
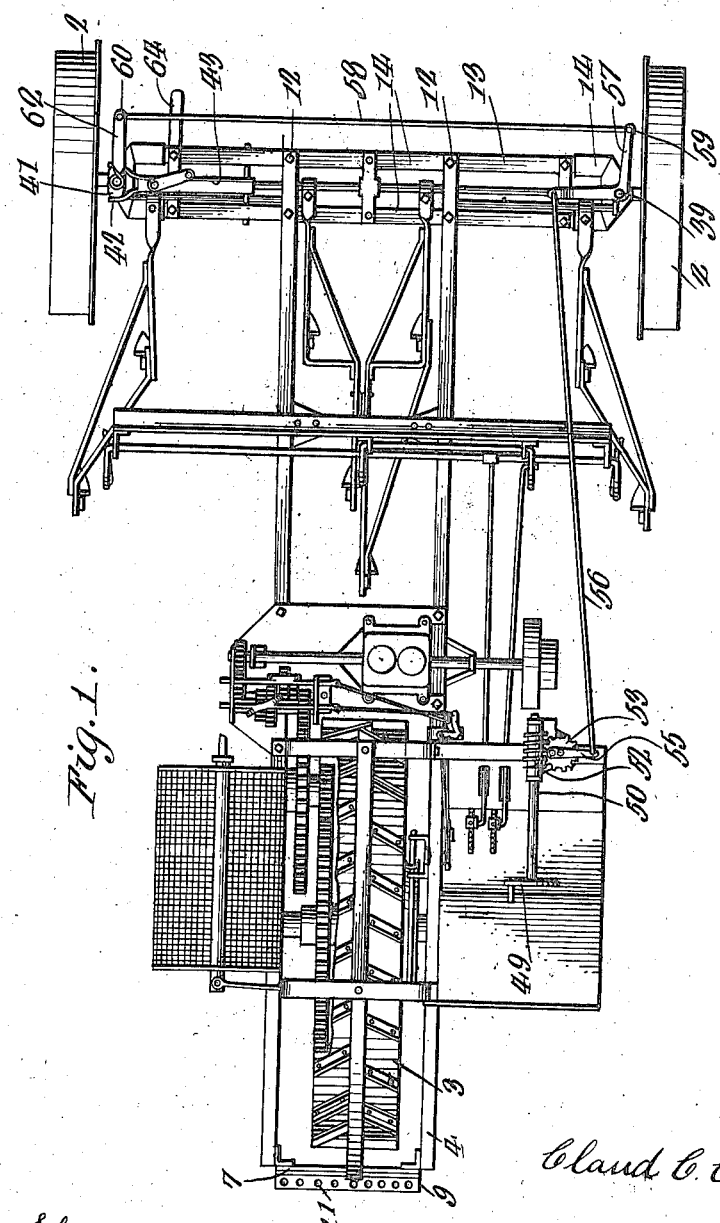
Figure 1, is a view in top plan of my improved tractor.

Referring now to the drawings by numerals, 1 designates as an entirety the machine frame, 2—2 the front or steering wheels and 3 a rear or traction wheel of a relatively large diameter. The traction wheel 3 is mounted to operate between longitudinal beams 4—4 constituting the main frame 1 of the machine. Arms or supports 5 are hung to depend from the main frame 1 that a fixed axle 6 for the traction wheel 3 may be properly supported therebetween. A cross beam 7 is mounted to connect the longitudinal beams 4 at the rear end of the frame that the latter may be braced perceptibly.

Supports 8 are hung to depend from the rear end of the main frame 1, each support being provided with vertically alined apertures (not shown) that a draw bar 9 may be adjusted vertically relatively thereto. Each of the mentioned supports 8 is braced as indicated at 10. Draw bar 9 is in turn provided with a plurality of alined apertures 11 that a vehicular body may be drawn by the tractor upon either side of the center of the draft.

The forward end of the main frame 1 is detachably secured as indicated at 12 to an auxiliary or supporting frame 13. Said frame 13 may be said to consist of beams 14 disposed in parallelism and connected at their respective terminals through the medium of castings 14' of a construction shown. Apertures or openings 15 are formed in the beams 14 in transversely alined relation that the fastening means 12 for the main frame 1 may be passed therethrough in fastening the mentioned frame 1 in its adjusted position.

The front or steering wheels 2 are mounted on spindles or right angle extensions 38 of vertical axles designated respectively 39 and 40, the last mentioned axle being relatively elongated that the steering wheel 2 mounted thereon may be adjusted vertically to maintain the machine frame when operating on a hillside, in a substantially horizontal plane. The castings 14' at the end of the supporting frame 13 act as bearings for the axles 39 and 40.

Axle 40 is fastened in any suitable manner to a swivel plate 41 in turn fastened at the bifurcated end 42 of an adjusting lever 43. Said lever 43 is maintained normally in a horizontal plane above the supporting frame 13 through the medium of an upright or standard 44 pivoted to the said supporting frame 13 as at 45 and to the lever as at 46. An operating screw 47 is mounted to threadedly engage with the supporting frame 13 and with the lever 43 that the mentioned lever may be raised and lowered to accordingly raise and lower the front wheel 2 adjacent which it is disposed. A crank handle 48 is formed upon the screw 47 that its operation may be facilitated.

In operation, the machine or tractor is steered from a point in proximity to the operator's seat (hereinafter described) through manipulation of a steering wheel 49 mounted on a steering post or column 50 journaled in bearings 51. The mentioned post or column 50 carries a worm 52 for engagement with a gear 53 in turn mounted on a stub shaft 54. Said shaft 54 carries an arm 55 to which a connecting rod 56 is secured. Said rod 56 at its forward end is fastened or secured to a substantially bell crank lever 57 mounted on the axle 39. The arms of the bell crank extend substantially at a right angle and as shown to advantage in Fig. 2. A steering rod 58 is pivoted as at 59 to one of the mentioned bell crank arms and as at 60 to a vertical rod 61 fastened at its respective terminals to arms 62 and 63 fastened to the axle 40. A support member 64 extends forwardly of the supporting frame 13 adjacent one end thereof to provide a rest or support for the rod 58.

Through the steering arrangement just described it is evident that the wheels 2 may be swung in unison at an angle to the machine frame through manipulation of the steering wheel 49, the rod 58 acting as a means whereby the axles 39 and 40 may be turned simultaneously. By the provision of the rod 61, adjustment of the axle 40 will in no way effect the operativeness of the steering mechanism.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a tractor, a main frame, a front wheel supporting frame having detachable connection with said main frame to be adjusted laterally thereof, a traction wheel, power means carried by said main frame for driving the traction wheel, and adjustable means directly associated with said supporting frame to maintain the main frame in a substantially horizontal plane.

2. In a tractor, a main frame, a supporting frame having detachable connection with said main frame to be adjusted laterally thereof, steering wheels mounted at the end of the supporting frame, a means to adjust one of the steering wheels vertically with respect to said supporting frame, a traction wheel, and a power means for driving said wheel.

3. In a tractor, a main frame, a traction wheel, a power means mounted on the main frame for driving said traction wheel, steering wheels, a means to adjust one of said steering wheels vertically with respect to the main frame, and a steering mechanism having connection with the steering wheels.

4. In a tractor, a main frame, a supporting frame having detachable connection with said main frame to be adjusted laterally thereof, vertical axles mounted at the terminals of the supporting frame, a steering wheel mounted on each axle, one of said axles being relatively elongated, a pivoted lever having connection with said last mentioned axle, an operating screw turnable to actuate said lever and to adjust the steering wheel mounted on said elongated axle vertically relatively to said supporting frame, a traction wheel, and a power means mounted on the main frame to drive said traction wheel.

5. In a tractor, a main frame, a supporting frame, vertical axles mounted at the terminals of the said supporting frame, a steering wheel mounted on each axle, one of said axles being relatively elongated, a lever having pivotal connection with said elongated axle, means supporting the said lever for pivotal movement above said supporting frame, an operating screw carried by said lever and engaging the supporting frame to adjust the steering wheel mounted on said elongated axle vertically relatively to said supporting frame, arms mounted on said elongated axle in spaced relation, a rod connecting the mentioned arms, a bell crank mounted on the other of the said axles, a rod connecting the bell crank and the said connecting rod, and a means to actuate the bell crank for simultaneously bringing the said steering wheels at an angle to the frame, substantially as described.

In testimony whereof I affix my signature in presence of two witnesses.

CLAUD C. CRAVEN.

Witnesses:
A. A. BRENNEMAN,
F. H. HUNTER.